US006389549B1

(12) United States Patent
Murase

(10) Patent No.: US 6,389,549 B1
(45) Date of Patent: May 14, 2002

(54) LIST MANAGEMENT SYSTEM, A LIST MANAGEMENT METHOD, A RECORDING MEDIUM WHEREIN A COMPUTER PROGRAM FOR REALIZING THE LIST MANAGEMENT SYSTEM IS RECORDED AND A PACKET EXCHANGE WHEREIN THE LIST MANAGEMENT SYSTEM IS APPLIED

(75) Inventor: Tutomu Murase, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/163,365

(22) Filed: Sep. 30, 1998

(30) Foreign Application Priority Data

Sep. 30, 1997 (JP) .............................................. 9-267387

(51) Int. Cl.[7] ................................................ G06F 1/14
(52) U.S. Cl. ........................................ 713/502; 709/238
(58) Field of Search ........................... 713/502; 709/200, 709/223, 224, 226, 238

(56) References Cited

U.S. PATENT DOCUMENTS 5,062,055 A * 10/1991 Chinnaswamy et al. .... 364/513
5,369,570 A * 11/1994 Parad .......................... 364/401
5,951,649 A * 9/1999 Dobbins et al. ............ 709/238
6,026,452 A * 2/2000 Pitts ............................. 710/56

FOREIGN PATENT DOCUMENTS

| JP | 2-299038 A | 12/1990 |
| JP | 4-237344 A | 8/1992 |
| JP | 6-52019 | 2/1994 |
| JP | 6-106795 | 4/1994 |
| JP | 6-261078 | 9/1994 |
| JP | 7-30587 | 1/1995 |

* cited by examiner

Primary Examiner—Dennis M. Butler
(74) Attorney, Agent, or Firm—Sughrue Mion, PLLC

(57) ABSTRACT

To provide a list management system of the same effectiveness with the LRU method with smaller overhead of the CPU, a list management system comprises: a trigger generating means (14) for generating a trigger signal every time when a time interval is passed; counters (21) each corresponding to each of a plurality of processes (20) and counting a reference frequency of each of the processes (20); a list (24) of elements each corresponding to each of the processes (20) and connected with each other by way of pointer data; and a list maintenance means (23) for rearranging order of the elements according to count values of the counters in descending order of the count values, when the trigger signal is generated.

30 Claims, 16 Drawing Sheets

FIG.4A

| PROCESS-1 | 0 0 1 1 |
|---|---|
| PROCESS-2 | 0 0 0 0 |
| PROCESS-3 | 0 0 1 1 |
| PROCESS-4 | 0 1 0 1 |
| PROCESS-5 | 0 0 0 1 |

FIG.4B

| PROCESS-1 | 0 0 0 0 |
|---|---|
| PROCESS-2 | 0 0 0 0 |
| PROCESS-3 | 0 0 0 0 |
| PROCESS-4 | 0 0 0 0 |
| PROCESS-5 | 0 0 0 0 |

LIST MANAGEMENT SYSTEM, A LIST MANAGEMENT METHOD, A RECORDING MEDIUM WHEREIN A COMPUTER PROGRAM FOR REALIZING THE LIST MANAGEMENT SYSTEM IS RECORDED AND A PACKET EXCHANGE WHEREIN THE LIST MANAGEMENT SYSTEM IS APPLIED

BACKGROUND OF THE INVENTION

The present invention relates to a list management system, a list management method, and a recording medium wherein a computer program for realizing the list management system is recorded, and particularly to those which enable substantially equivalent list rearrangement to that performed according to an LRU (Least-Recently-Used) method with smaller overhead of a CPU (Central Processor Unit) than the LRU method.

The present invention also relates to a packet exchange which can retrieve next destination of packets with high-speed.

When there are numbers of demands to use limited resources, such as a high-speed memory of a computer, there is a method for improving usage efficiency of the resources by assigning the limited resources to the demands according to usage frequency of each unit (hereinafter called a process, and usage of a resource by a process being called a reference), such as a data set obtained from a database, to use the resources.

As an algorithm for tracing the above usage frequency, the LRU method is well known.

In the LRU method, a list is used for managing the reference frequency of each process. Every time when a process is referred to, the referred process is ranged at the top of the list. Suppose ten processes, a first to a tenth process, are ranged in the order such as 1→2→3→4→5→6→7→8→9→10, in the list. When the fifth process is referred to in the case, the order of the list is rearranged as 5→1→2→3→4→6→7→8→9→10. When a new eleventh process is referred to, the tenth process, which has been ranged at the end of the list as it has not been referred to for a longest interval, is expelled from the list.

As above described, every time when a process is referred to, a list management program is started for rearranging the list, in the LRU method. The list management program searches a position of the referred process in the list, connects a preceding process of the referred process to a following process of the referred process, and ranges the referred process at the top of the list. Therefore, the list management program may take considerable overhead, resulting in degradation of operational speed for performing the processes themselves.

This is a problem.

In a packet transmission network, data are transmitted being divided in units of packets having a fixed length, for example. Each packet has its final destination. The packet exchange in the packet transmission network retrieves a next destination whereto a received packet is to be forwarded according to the final destination.

Usually, length of transmission data is longer than a packet length, and the data are divided into numbers of packets to be transmitted in succession having the same final destination, which means that a packet exchange has high possibility to receive packets having the same final destination with a packet previously received. Therefore, how to retrieve the next destination of successive packets including packets having the same final destination, with high speed, is very important for improving performance of the packet exchange.

SUMMARY OF THE INVENTION

Therefore, a primary object of the present invention is to provide a list management system and a list management method which enable substantially the same effectiveness with the LRU method and take but smaller overhead of the CPU than the LRU method.

Another object is to provide a recording medium wherein a computer program for realizing the above list management system is recorded.

Still another object is to provide a packet exchange which can retrieve next destinations of the received packets with high speed and an economical configuration as well.

In order to achieve the objects, a list management system of the invention comprises:

a trigger generating means for generating a trigger signal every time when a time interval is passed;

counters each corresponding to each of a plurality of processes and counting a reference frequency of each of the processes;

a list of elements each corresponding to each of the processes and connected with each other by way of pointer data; and a list maintenance means for rearranging order of the elements according to count values of the counters, when the trigger signal is generated.

Each of the elements is rearranged by the list management means in descending order of the reference frequency counted by corresponding one of the counters. The time interval is so determined that sufficient numbers of process references are performed in the time interval for evaluating substantial differences of reference frequencies between the processes. The operational time for counting up the counters is far shorter than that needed for rearranging the list. Therefore, by rearranging the list at appropriate timings, average overhead taken for the list management can be considerably reduced compared to the conventional LRU method, providing substantially the same effectiveness of the list management with the LRU method.

The time interval may be controlled according to the reference frequency counted by each of the counters.

The trigger generating means may generate a first trigger signal every time when a first time interval is passed and a second trigger signal every time when a second time interval is passed; and the list maintenance means may rearrange the elements and clears the count values when the first trigger signal is generated, and rearrange the elements without clearing the count values when the second trigger is generated.

In this case, the list maintenance means may control either or both of the first time interval and the second time interval according to the reference frequency counted by each of the counters, and further, the list maintenance means may disable generation of the second trigger signal, when the first time interval becomes longer than the second time interval.

The elements which correspond to the counters showing the same count values may be ranged according to previous order of the elements, or ranged-in the same order making use of horizontal pointers.

Instead of the trigger generating means above described, an operation monitor may be provided for generating the trigger signal when an operational load of a CPU is discriminated to be light, when the reference of the processes and the list management is performed by the CPU.

A packet exchange according to the invention, for forwarding each of received packets to a next destination determined according to a final destination described in said each of the received packets, comprises:

a trigger generating means for generating a trigger signal;

a first memory for storing a plurality of first data sets each including information of a next destination corresponding to each of final destinations which are possible to be described in the received packets;

a second memory for storing each of second data sets in each of addresses of the second memory, the second data sets being a part of the first data sets and the second memory being accessed with higher speed than the first memory;

counters each corresponding to each of the addresses of the second memory;

a first retrieving means for retrieving data of a next destination corresponding to a final destination described in a received packet from the second data sets stored in the second memory;

a memory management means for incrementing a count value of one of the counters when the first retrieving means successes to retrieve the data of the next destination from an address of the second memory corresponding to said one of the counters;

a second retrieving means for retrieving data of the next destination corresponding to the final destination described in the received packet from the first data sets stored in the first memory when the first retrieving means can not retrieve the data of the next destination from any address of the second memory; and a memory maintenance means for revising a necessary number of the second data sets stored in the second memory into data sets each including each of next destinations retrieved by the second retrieving means from the first memory, the necessary number of the second data sets being selected according to count values of the counters at a timing when the trigger signal is generated.

The first retrieving means comprises:

a comparator for comparing the final destination described in the received packet to each of final destinations of the second data sets stored in the second memory, and outputting an address of the second memory where a data set having the same final destination with the final destination described in the received packet is stored, when the data set having the same final destination is found; and a selector for outputting a next destination corresponding to the final destination described in the received packet by accessing the second memory making use of the address output from the comparator.

Therefore, data sets of the final destination and the next destination which are frequently referred to are written in the high-speed memory, and hence, retrieval of next destinations of the received packet can be performed with high speed and performance of the packet exchange is improved. Furthermore, the data update of the second data sets is performed at an appropriate interval, and hence, the retrieval of the next destination is little affected by the overhead taken by the data update of the second data sets.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 4A shows an example of the data in the bit-map 21 of FIG. 2 before rearrangement;

FIG. 4B shows the data in the bit-map 21 after rearrangement;

DETAILED DESCRIPTION OF THE PREFERRED EMBODIMENTS

Figure 1:
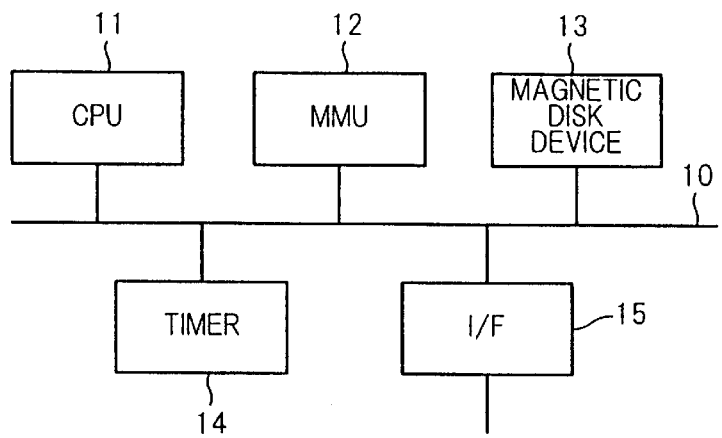
FIG. 1 is a block diagram illustrating an example of hardware configuration for realizing the data retrieving means of a packet exchange according to a first to a fifth embodiment of the invention.

Now, embodiments of the present invention will be described referring to the drawings.

A first to a sixth embodiment will be described in connection with a data retrieving means for retrieving next destinations of packets embodied in a main memory unit provided in a packet exchange, and a seventh embodiment will be described in connection with a data retrieving means embodied with a special hardware table provided in a packet exchange for retrieving the next destinations.

FIG. 1 is a block diagram illustrating an example of hardware configuration for realizing the data retrieving means of a packet exchange according to the first to the fifth embodiment.

As illustrated in FIG. 1, the data retrieving means comprises a CPU (Central Processing Unit) 11, a MMU (Main Memory Unit) 12, a magnetic disk device 13, a timer 14, an interface 15 and bus lines 10 for connecting them with each other.

The CPU 11 controls the data retrieving means by executing programs prepared in the MMU 12.

The MMU 12 has a memory space wherein a cache table, a bit-map and a list, which will be described afterwards, are to be deployed, together with a memory space for storing the programs (including a data-retrieval task and a list-management task which will be also described afterwards) to be executed by the CPU 11.

In the magnetic disk device 13, all of the next-destination data to be retrieved are stored in connection with the final-destination data. The magnetic disk device 13 has a larger memory space but needs longer access time than the MMU 12.

In the timer 14, an initial value Ta is registered and a down-counter decrements its count value T from the initial value Ta to 0 in synchronization with a clock signal. When the count value becomes 0, the timer 14 outputs a trigger signal to the CPU 11 and resets the count value T to the initial value Ta.

The interface 15 tales charge of interfacing the data retrieving means with other components of the packet exchange, such as receiving retrieval requests of the next destination of packets or outputting the retrieval results. Data exchange with outside the data retrieving means is performed exclusively through the interface 15.

Figure 2:
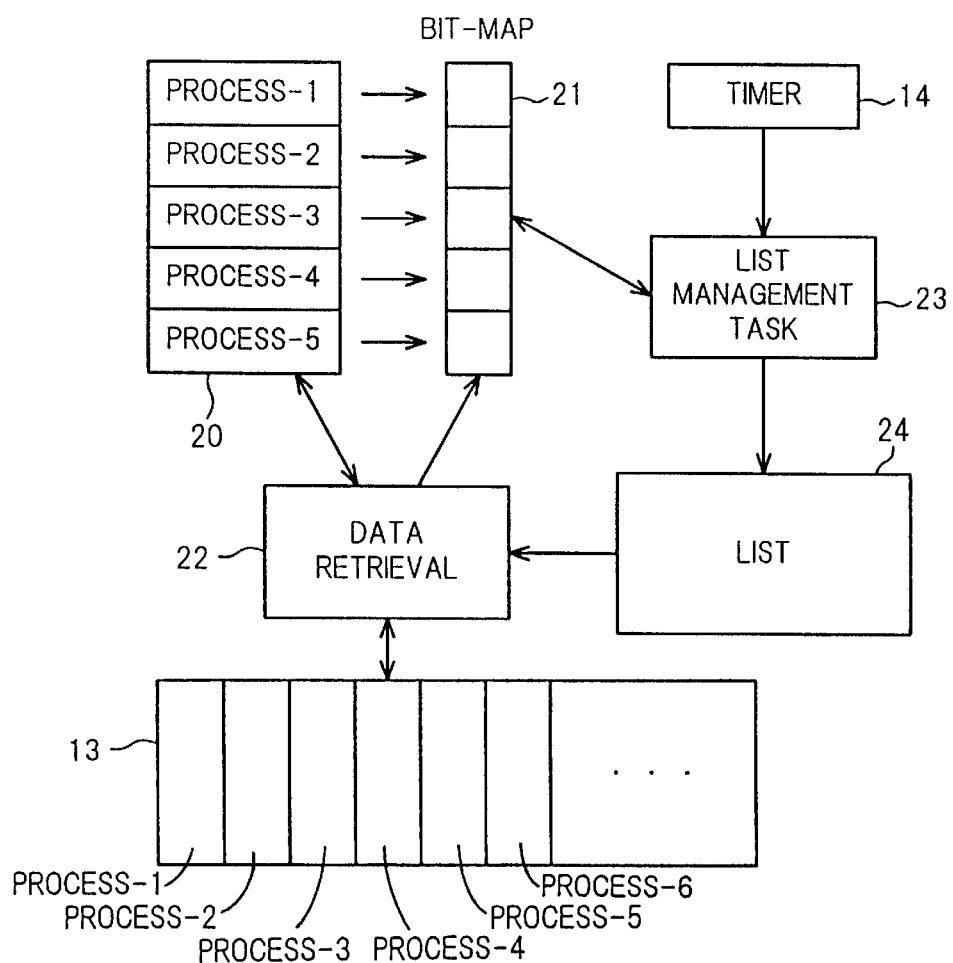
FIG. 2 is a functional block diagram illustrating data retrieval performed in the data retrieving means of FIG. 1.

FIG. 2 is a functional block diagram illustrating data retrieval performed in the data retrieving means of FIG. 1, which is realized by the CPU 11 executing the programs stored in the MMU 12.

In the functional block diagram of FIG. 2, there are depicted a cache table 20, a bit-map 21, a data-retrieval task 22, a list-management task 23, a list 24, the magnetic disk device 13 wherein the next-destination data are stored, and the timer 14.

The cache table 20 is provided in the MMU 12 and stores a part of the next-destination data. When a next-destination retrieval is requested and the requested next destination is written in the cache table 20, the requested next destination is output being read out from the cache table 20. When the requested next destination is not found in the cache table 20, it is retrieved from the magnetic disk device 13 and written in the cache table 20.

In the cache table 20, data of each next destination is written as each entry, in the embodiments. Data of each next destination, which is referred to individually, is called a process hereinafter, and a procedure to read out data of a next destination from the cache memory or to write data of a next destination read out of the magnetic disk device 13 into the cache table 20 is called a reference of the process.

The bit-map 21, which is also provided in the MMU 12, comprises a plurality of counters each corresponding to each of processes stored in the cache table 20. When a process in the cache table 20 is referred to, corresponding one of the counters is incremented by the CPU 11. After the count value has become maximum, '1111', for example, in case of 4-bit binary counters, the count value remains maximum, even when its corresponding process is referred to more times.

The data-retrieval task 22 is a task performed by the CPU 11 for outputting data of a next destination through the interface 15 according to a retrieval request of the next destination input through the interface 15. When a retrieval request for a next destination is received, the data-retrieval task 22 searches the cache table 20 in the MMU 12, for the first. If the requested data is written in the cache table 20, it is read out from the cache table 20 to be output. When the requested data is not found in the cache table 20, the data-retrieval task 22 searches the magnetic disk device 13 for the requested data, which is read out and output through the interface 15, and at the same time, written as a new process in the cache table 20 at an address of an old process indicated by the last element of the list 24, expelling the old process. The data-retrieval task 22 also takes charge of incrementing a counter in the bit-map 21 every time when a process corresponding to the counter is referred to.

The list-management task 23 is started every time when the trigger signal is input to the CPU 11 from the timer 14. The list-management task 23 takes charge of rearranging elements of the list 24, each corresponding to each of the processes in the cache table 20, according to count values of the counters in the bit-map 21, and clearing the bit-map 21 after the elements are rearranged.

The list 24 is a uni-directional list consisting of elements each having address data of its corresponding process written in the cache table 20 (except when the process is expelled after the last rearrangement) and pointer data indicating a next element. The elements of the list 24 are ranged in the order of reference frequencies of their corresponding processes for managing the processes written in the cache table 20. Besides the elements ranged in the order, the list 24 has pointer data for indicating the top element.

Now, operation of the data retrieving means of FIG. 1 according to the first embodiment is described.

When a retrieval request for a next destination of a packet is requested to the CPU 11 through the interface 15, the CPU 11 starts the data-retrieval task 22.

The data-retrieval task 22 checks whether data of the requested next destination is written or not as a process in the cache table 20 for the first, by searching the cache table 20 with a final destination indicated by the retrieval request. When the data of the requested next destination is written as a process, the data-retrieval task 22 outputs the data through the interface 15, and count up one of the counters in the bit-map 21 corresponding to the process which is referred to.

When the requested next destination is not written in the cache table 20, the data-retrieval task 22 accesses the magnetic disk device 13 and reads out the requested next destination therefrom. Then, the data-retrieval task 22 accesses the list 24 for determining where to write the data of the next destination read out from the magnetic disk device 13, and overwrite the data at an address of the cache table 20 where an old process corresponding to the last element of the list 24 has been written. Thus, a reference of a new process, namely, the data of the next destination newly written in the cache memory 20 is performed and a counter of the bit-map 21 corresponding to the new process is set to one.

On the other hand, the count value T in the timer 14 is decremented from the initial value Ta according to the clock signal and a trigger signal is generated when the count value T becomes 0. Receiving the trigger signal, the CPU 11 starts the list-management task 23.

Figure 3:
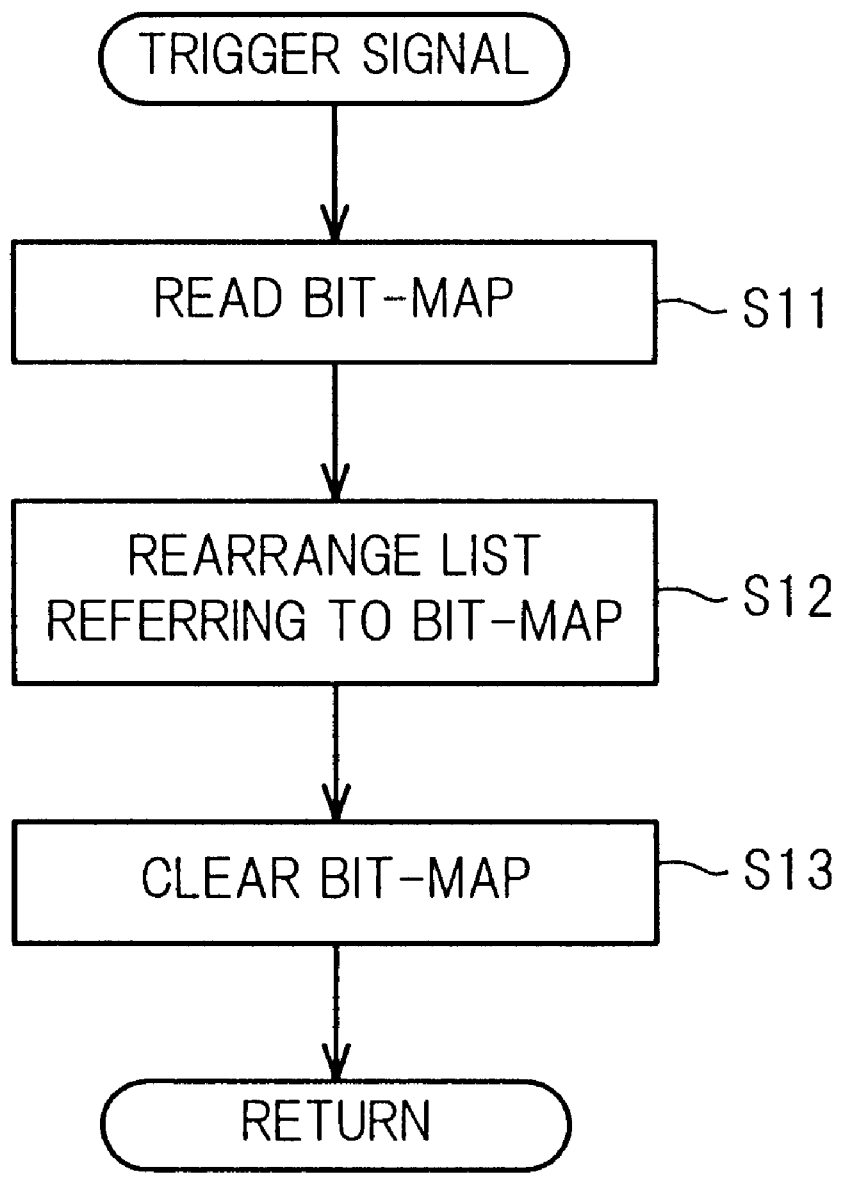
FIG. 3 is a flowchart illustrating a procedure performed by the list-management task 23 in the first embodiment of the invention.

FIG. 3 is a flowchart illustrating a procedure performed by the list-management task 23 in the embodiment.

When the list-management task 23 is started with the trigger signal, the CPU 11 reads the bit-map 21 in the MMU 12 and stores data in the bit-map 21 in an internal register of the CPU 11 (at step S11). Then, the CPU 11 rearranges elements of the list 24 so that the elements make a queue ranged in a descending order of count values of the counters each corresponding to each of the elements, referring to the bit-map data stored in the internal register (at step S12). The rearrangement may be performed according to any appropriate conventional algorithm, such as a heap-sort or a bubble-sort. In this embodiment, elements corresponding to processes whereof counters show the same count value are ranged according to the order of a preceding rearrangement performed by the list-management task 23.

When the rearrangement of the elements of the list 24 is accomplished, data of the bit-map 21 are cleared (at step S13) by overwriting '0' bits therein, and the list-management task 23 is returned.

Figure 5A:
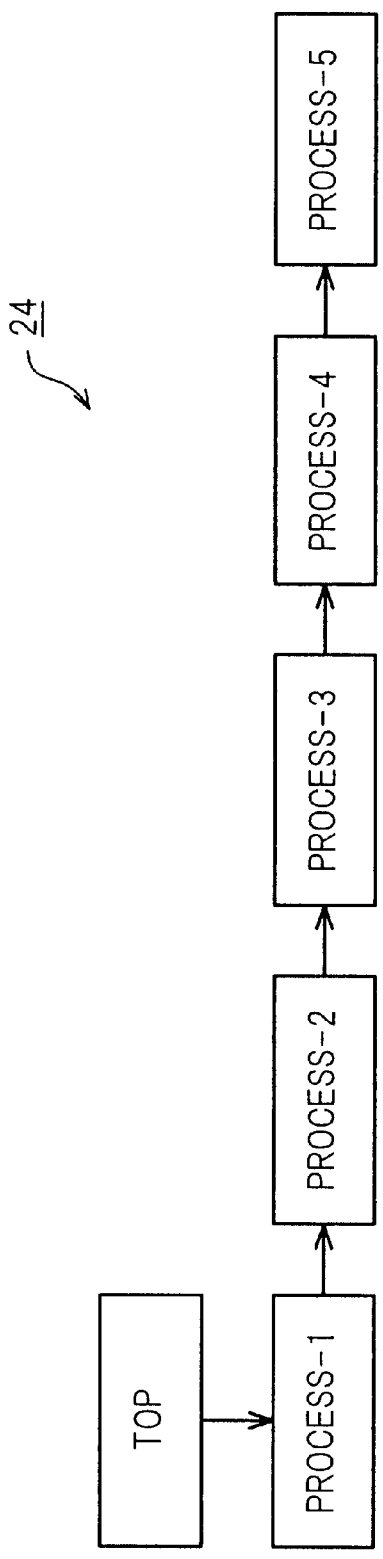
FIG. 5A shows a queue of the elements of the list 24 of FIG. 2 before rearrangement.

FIG. 4A shows an example of the data in the bit-map 21 indicating count values of the counters each corresponding to each of the processes, a process-1 to a process-5, for example, just before a list-management task 23 is started, and FIG. 5A shows a queue of the elements of the list 24 each corresponding to each of the processes, the process-1 to the process-5, at the same timing.

Figure 5B:
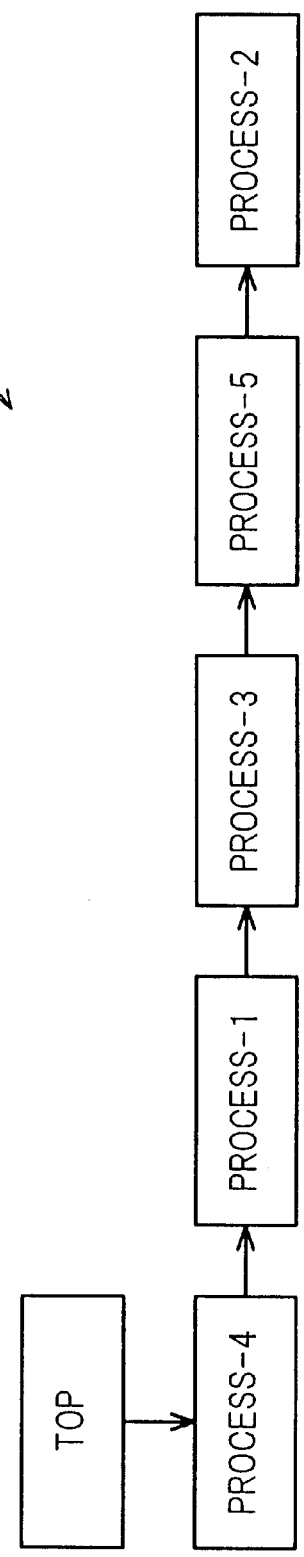
FIG. 5B shows the queue of FIG. 5A after rearrangement.

In the example, a count value '0101' of a fourth counter corresponding to the process-4 is the largest. Therefore, the fourth element of the list 24 of FIG. 5A corresponding to the process-4 is rearranged at the top of the queue as shown in FIG. 5B which illustrates the queue just after rearranged by the list-management task 23. The count values corresponding to the process-i and the process-3 are both '0011', next largest in FIG. 4A. However, the element corresponding to the process-1 is ranged before the element corresponding to the process-2, in the queue of FIG. 5A. Therefore, the element corresponding to the process-1 is ranged at the second and the element corresponding to the process-3 is ranged at the third of the queue of FIG. 5B. In the same way, the elements corresponding to the process-5 and the process-2 are ranged in the order following to the element corresponding to the process-3 by the list-management task 23, here at step S12, as illustrated in FIG. 5B.

After the rearrangement of the list 24, the bit-map 21 is cleared as illustrated in FIG. 4B.

Thus, the element corresponding to a process which is not referred to frequently is shifted towards rear end of the list 24 along with repetition of the rearrangement.

Figure 6:
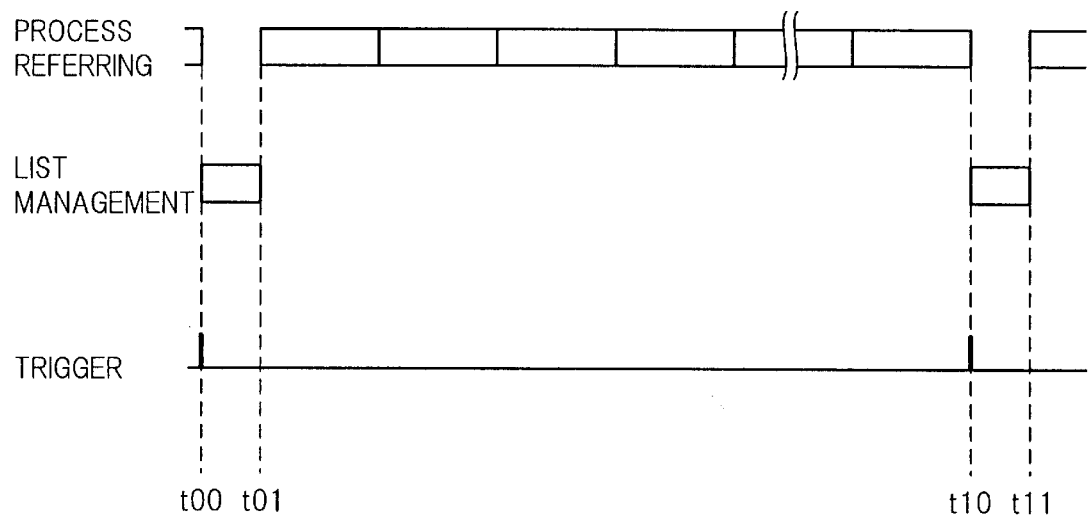
FIG. 6 is a timing chart illustrating a sequence of the procedures performed in the first embodiment.

FIG. 6 is a timing chart illustrating a sequence of the procedures above described. In the timing chart of FIG. 6, it is assumed for simplifying the description that a time needed for referring to every process is the same and no other task is performed by the CPU 11, and that every process referring is accomplished in the cache table 20, that is, no process is expelled between two consecutive trigger signals.

As shown in FIG. 6, when a trigger signal is supplied to the CPU 11 from the timer 14 at a timing t00, the CPU 11 executes the list-management task 23 until a timing t01. During a time interval between the timing t01 and a timing t10 where a next trigger signal is supplied to the CPU 11, the CPU performs process referrings in succession. When the next trigger signal is supplied at the timing t10, the CPU 11 starts again the list-management task 23 for rearranging the list 24.

Figure 7:
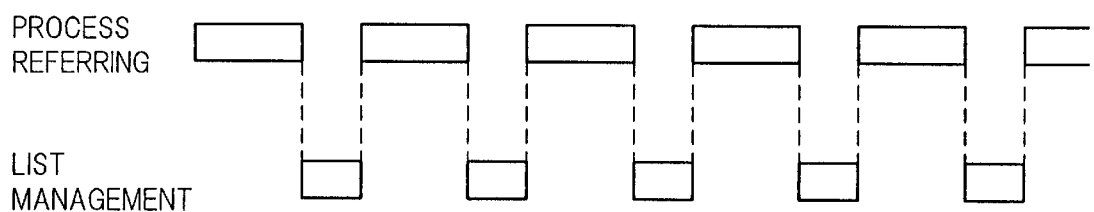
FIG. 7 is a timing chart illustrating procedures to be performed in the conventional LRU method by way of comparison example to the procedures of FIG. 6 according the first embodiment.

FIG. 7 is a timing chart illustrating procedures to be performed in the conventional LRU method by way of comparison example to the procedures of the embodiment. In the timing chart of FIG. 7, it is also assumed that the time needed for referring to every process is the same and no other task is performed by the CPU 11, and that every process referring is accomplished in the cache table 20, that is, no process is expelled.

As shown in FIG. 7, every time when a process referring is accomplished, the CPU 11 starts a list-management task 23 for rearranging the list 24, according to the conventional LRU method.

In FIG. 7, the time needed for referring to each process may be a little shorter than that needed in the procedures of FIG. 6, because there is no need to count up a counter in the bit-map 21. However, in the procedures of FIG. 7, the list-management task 23, which needs far more steps than counting up a counter, should be performed instead of counting up the counter, every time a process is referred to. In the procedures of FIG. 6, the list-management task 23 may be performed once for numbers of process referrings, which takes far smaller overhead of the CPU 11 than the conventional procedures of FIG. 7.

For ranging an element at the top of a list having N elements, for example, N+3 steps are needed at most, that is, at most N steps for finding the concerning element by tracing pointers, one step for rewriting pointer data of a preceding element to indicate a following element of the concerning element, one step for rewriting pointer data of the concerning element to indicate the element which has been the top of the list, and one step for rewriting the pointer data for indicating the top element to indicate the concerning element. On the other hand, counting up a counter in the bit-map can be performed with one step.

Suppose a case where two specific processes are referred to in turn 20 times in a time interval, from the timing t01 to the timing t11 of FIG. 6, for example. In the case, the number of total steps needed for managing the list 24 is at most 2N+26=1×20+(N+3)×2 steps, according to the embodiment. On the other hand, according to the conventional LRU method, the number of steps needed for performing equivalent list management becomes 2N+96=(N+3)×2+5×18, that is, N+3 steps for first two process referrings and 2+3 steps for following 18 process referrings wherein the second element is every time rearranged to the top of the list.

As can be understood from the above example, the overhead of the CPU 11 necessary for updating the list 24 to be used for tracing reference frequencies of the processes can be considerably reduced compared to the conventional LRU method, retaining substantially the same effectiveness of the list 24, in the data retrieving means according to the embodiment.

Now, the second embodiment is described. The data retrieving means according to the second embodiment has substantially the same configuration and the same functions with the data retrieving means according to the first embodiment described referring to FIGS. 1 and 2. A difference of the second embodiment from the first embodiment lies in the structure of the list 24.

In the list 24 according to the second embodiment, elements corresponding to processes whereof counters in the bit-map 21 show the same count value are ranged in the same order, and hence, the list-management task 23 has a little different procedure from the procedure of FIG. 3.

Figure 8:
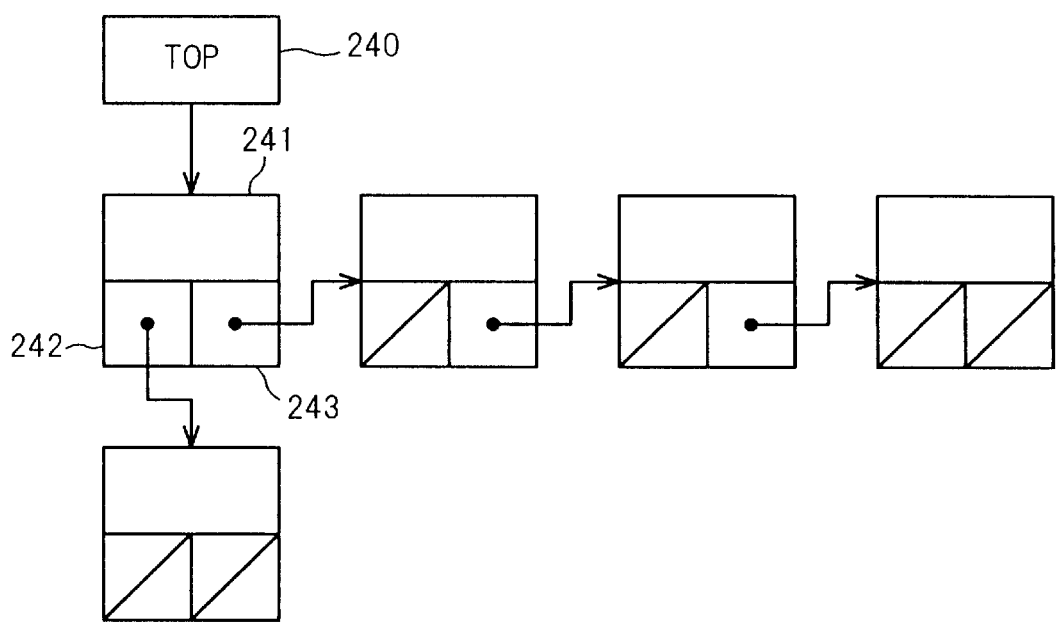
FIG. 8 is a schematic diagram illustrating a structure of the list 24 according to the second embodiment.

FIG. 8 is a schematic diagram illustrating the structure of the list 24 of the second embodiment, wherein each element has a data field 214 and a horizontal pointer 242 and a vertical pointer 243. The pointer data 240 for indicating the top point is also provided in the list 24 in the same way with the first embodiment. In the data field 241, address data of a corresponding process in the cache table 20 is written. The elements corresponding to processes having the same reference frequency (corresponding counters in the bit-map 21 showing the same count value) is connected with the horizontal pointer 242, and the elements corresponding to processes having different reference frequencies are chained in the descending order of the reference frequencies by way of the vertical pointers 243.

Figure 9:
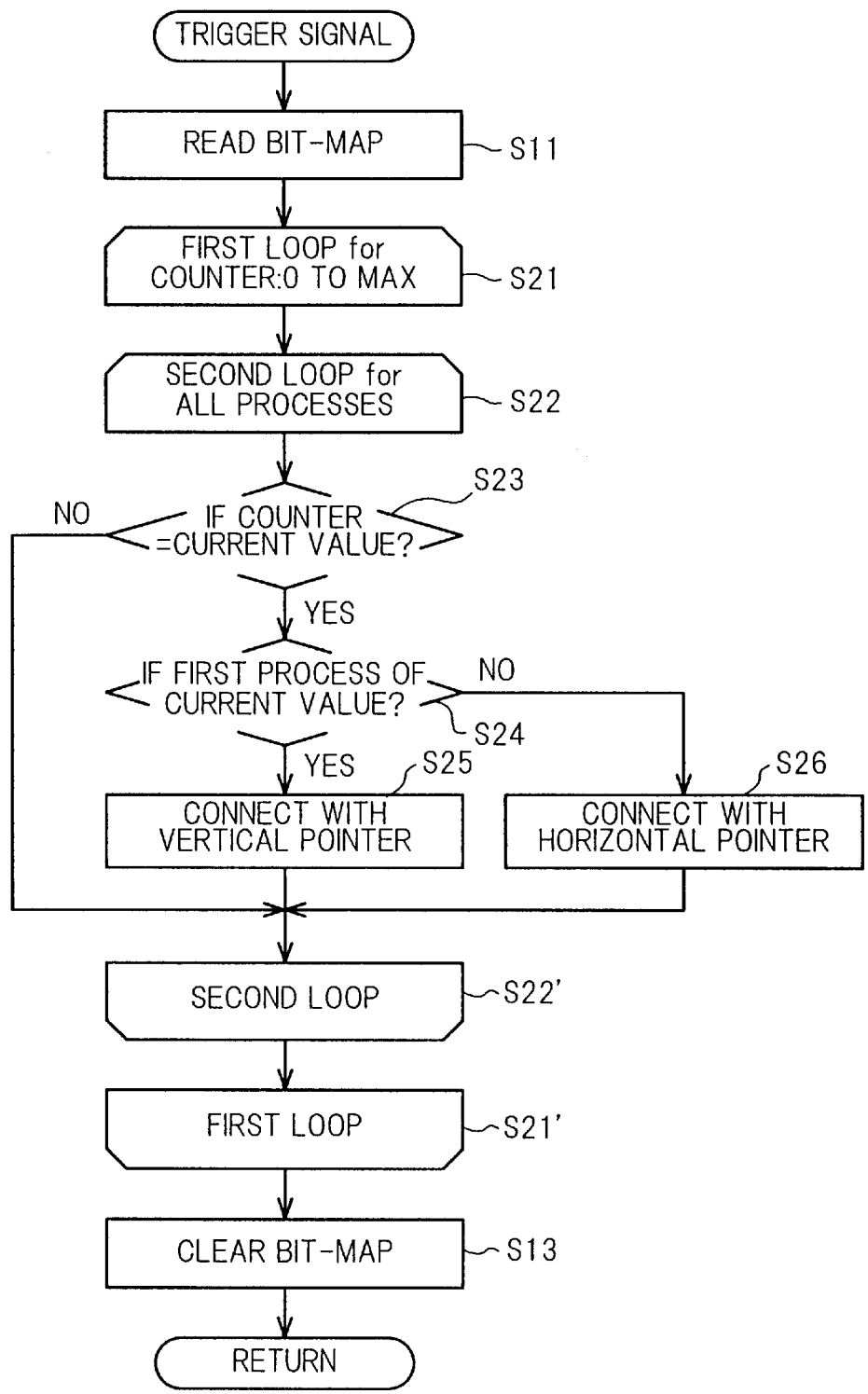
FIG. 9 is a flowchart illustrating the list-management task 23 of FIG. 2 performed in the second embodiment.

FIG. 9 is a flowchart illustrating the list-management task 23 performed in the second embodiment.

In the same way with the flowchart of FIG. 3, the list-management task 23 is started when a trigger signal is supplied to the CPU 11 from the timer 14, and the CPU 11 reads the bit-map 21 in the MMU 12 and stores data in the bit-map 21 in the internal register of the CPU 11 (at step S11).

Then, the CPU 11 performs the list-management task 23 following a double loop consisting of a first loop (steps S21 to S21') and a second loop (steps S22 to S22'). In the first loop, a variable corresponding to the count values of the counters in the bit-map 21 is changed form 0 to their maximum value (from '0000' to '1111' for 4-bit binary counters), and in the second loop, all elements of the old list structure which are not yet sorted into a new list structure are checked for each of the variable.

If the count value of corresponding counter of a concerning element is found equal to current value of the variable (at step S23), whether the concerning element is the first element of the current value or not is checked (at step S24). When it is true, the concerning element is ranged at temporary top of the new list structure with the vertical pointer (at step S25), by rewriting the vertical pointer 243 of the concerning element to indicate the element which has been the temporary top.

When the concerning element is not the first element (step S24: NO), the concerning element is connected to an element corresponding to another process of the same reference frequency by rewriting the horizontal pointer 242 of a previously sorted element to indicate the concerning element (at step S26).

When corresponding counter value is not the current value of the variable (step S23: NO), another element not yet checked for the current value is checked by repeating the second loop.

Thus, after rearrangement of the list structure of the list 24 is performed by repeating the double loop, the counter data of the bit-map 21 is cleared (at step S13) in the same way with FIG. 3, and the list-management task 23 is returned.

As above described, in the list 24 of the second embodiment, elements corresponding to processes of the same reference frequencies are not differentiated being connected with the horizontal pointers. Therefore, processing steps necessary for rearranging the elements may be reduced in the second embodiment than those necessary in the first embodiment.

Now, the third embodiment of the invention is described. The data retrieving means according to the third embodiment has also substantially the same configuration and the same functions with the data retrieving means according to the first embodiment described referring to FIGS. 1 and 2. A difference of the third embodiment from the first embodiment lies in that the initial value Ta which is set in the register of the timer 14 can be changed, and the list-management task 23 has a function to control the initial value Ta of the timer 14.

Figure 10:
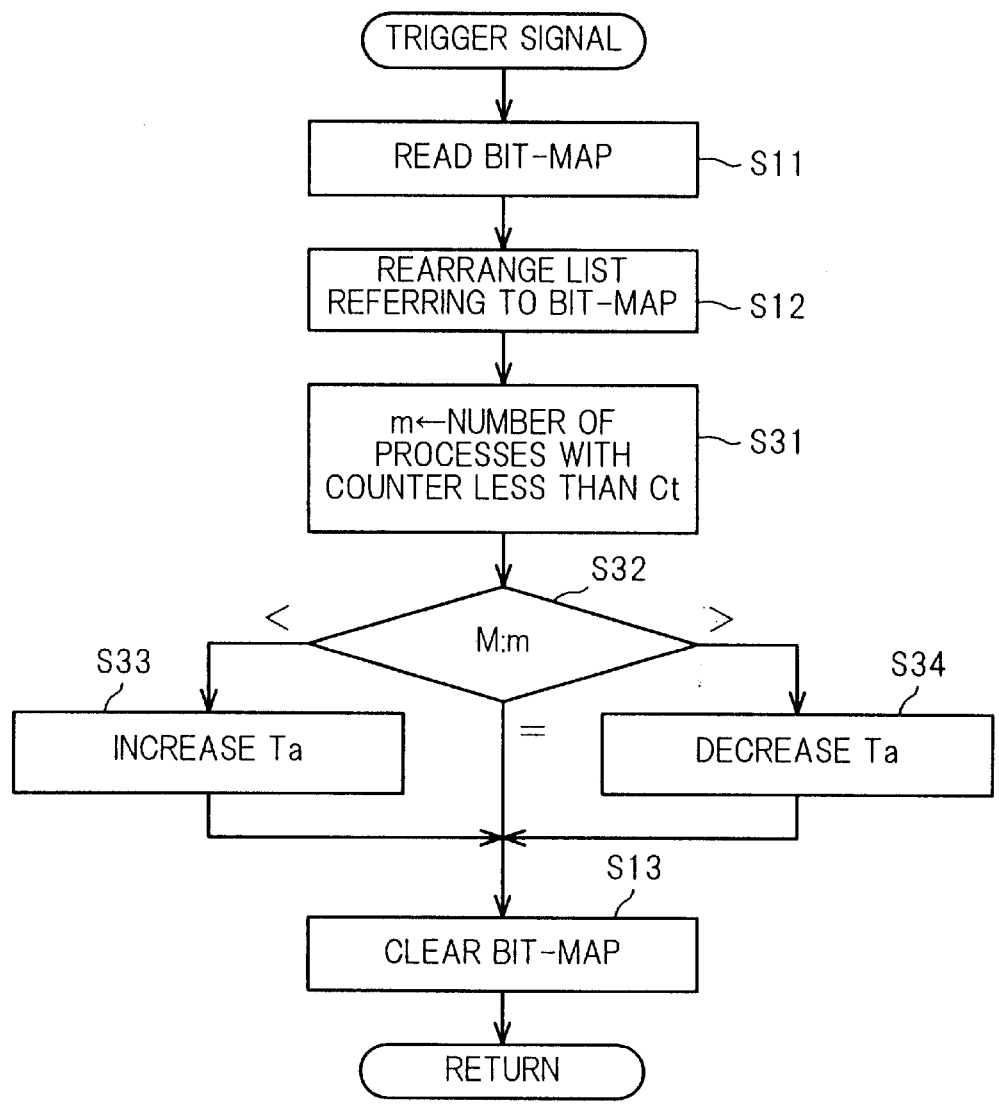
FIG. 10 is a flowchart illustrating the list-management task 23 performed in the third embodiment.

FIG. 10 is a flowchart illustrating the list-management task 23 performed in the third embodiment.

In the same way with the flowchart of FIG. 3, the list-management task 23 is started when a trigger signal is supplied to the CPU 11 from the timer 14. Reading the bit-map 21 in the MMU 12, the CPU 11 stores data in the bit-map 21 in the internal register of the CPU 11 (at step S11), and performs rearrangement of elements in the list 24 in the descending order of count values in the bit-map 21 in the same way with the first embodiment or the second embodiment (at step S12).

After rearranging the elements of the list 24, the CPU 11 counts a number m of processes whereof count values are smaller than a predetermined value Ct (at step S31). Then, the CPU 11 compares the number m to a threshold value M (at step S32). When the number m is larger than the threshold value M, the CPU 11 increases the initial value Ta registered in the timer 14 (at step S33), while the CPU 11 decreases the initial value Ta (at step S34) when the number m is smaller than the threshold value M, leaving the initial value Ta as it is when the number m is equal to the threshold value M.

Thus, after revising the initial value Ta, the counter data of the bit-map 21 is cleared (at step S13) in the same way with FIG. 3, and the list-management task 23 is returned.

As above described, the initial value Ta registered in the timer 14, and consequently, the time interval whereby the list-management task 23 is performed is so controlled that the rearrangement of elements of the list 24 is performed more frequently when more numbers of processes are referred to frequently and the rearrangement is performed less frequently when only fewer numbers of processes are referred to frequently. Therefore, the rearrangement of the elements of the list 24 can be performed at most appropriate timings according to the third embodiment.

Now, the fourth embodiment of the invention is described. The data retrieving means according to the fourth embodiment has also substantially the same configuration and the same functions with the data retrieving means according to the first embodiment described referring to FIGS. 1 and 2. A difference of the fourth embodiment from the first embodiment lies in that the timer 14 is so configured that it generates two kind of trigger signals, a trigger signal A and a trigger signal B, and that the list-management task 23 performs different procedures according to the kind of the trigger signals.

For the purpose, the timer 14 comprises two down-counters each for generating each of the trigger signal A and the trigger signal B, and two registers each storing each of two initial values Ta and Tb, determining time intervals of the trigger signal A and the trigger signal B, respectively, and both being changeable in the same way as in the third embodiment. The list-management task 23 controls the two initial values Ta and Tb referring to two respective threshold values M1 and M2, and has a function to disable the trigger signal B.

Figure 11:
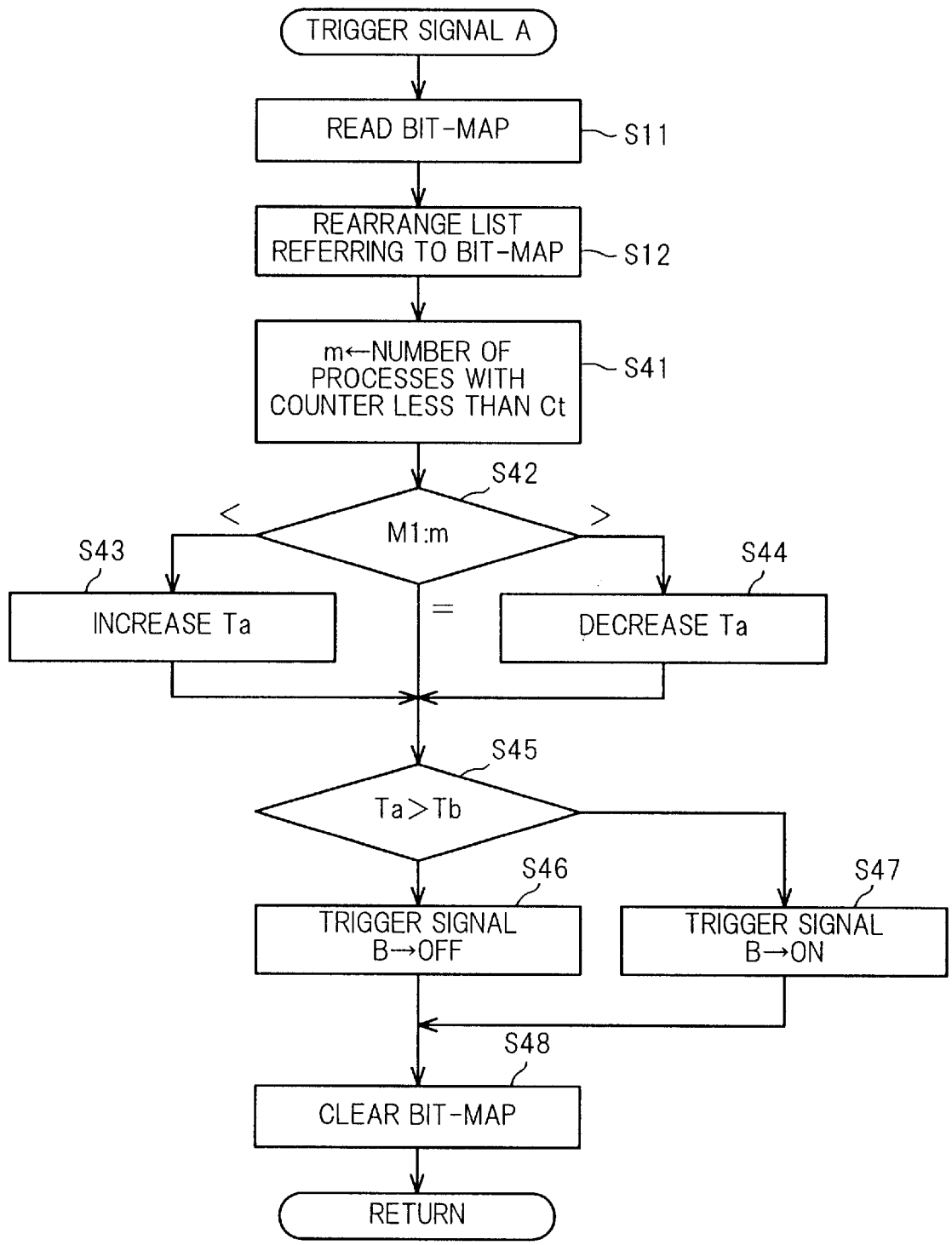
FIG. 11 is a flowchart illustrating the list-management task 23 which is started when the trigger signal A is supplied to the CPU 11 of FIG. 1, in the fourth embodiment.

FIG. 11 is a flowchart illustrating the list-management task 23 which is started when the trigger signal A is supplied to the CPU 11 in the fourth embodiment.

When the list-management task 23 is started with the trigger signal A, the CPU 11 stores data in the bit-map 21 in the internal register of the CPU 11 (at step S11) by reading the bit-map 21 in the MMU 12, performs rearrangement of elements in the list 24 in the descending order of count values in the bit-map 21 in the same way with the first embodiment or the second embodiment (at step S12). Then, the CPU 11 counts a number m of processes whereof count values are smaller than a predetermined value Ct (at step S41) in the same way with the third embodiment. Then, the CPU 11 compares the number m to the first threshold value M1 (at step S42). When the number m is larger than the first threshold value M1, the CPU 11 increases the first initial value Ta of the timer 14 (at step S43), while the CPU 11 decreases the first initial value Ta (at step S44) when the number m is smaller than the first threshold value M1, leaving the first initial value Ta as it is when the number m is equal to the first threshold value M1.

Then, the CPU 11 compares the first initial value Ta to the second initial value Tb (at step S45). When the first initial value Ta is larger than the second initial value Tb, the CPU 11 disables the trigger signal B (at step S46), while the CPU 11 enables the trigger signal B when the first initial value Ta is not larger than the second initial value Tb (at step S47).

After controlling the first initial value Ta, the list-management task 23 started by the trigger signal A clears the count data of the bit-map 21 (at step S48) and returns.

Figure 12:
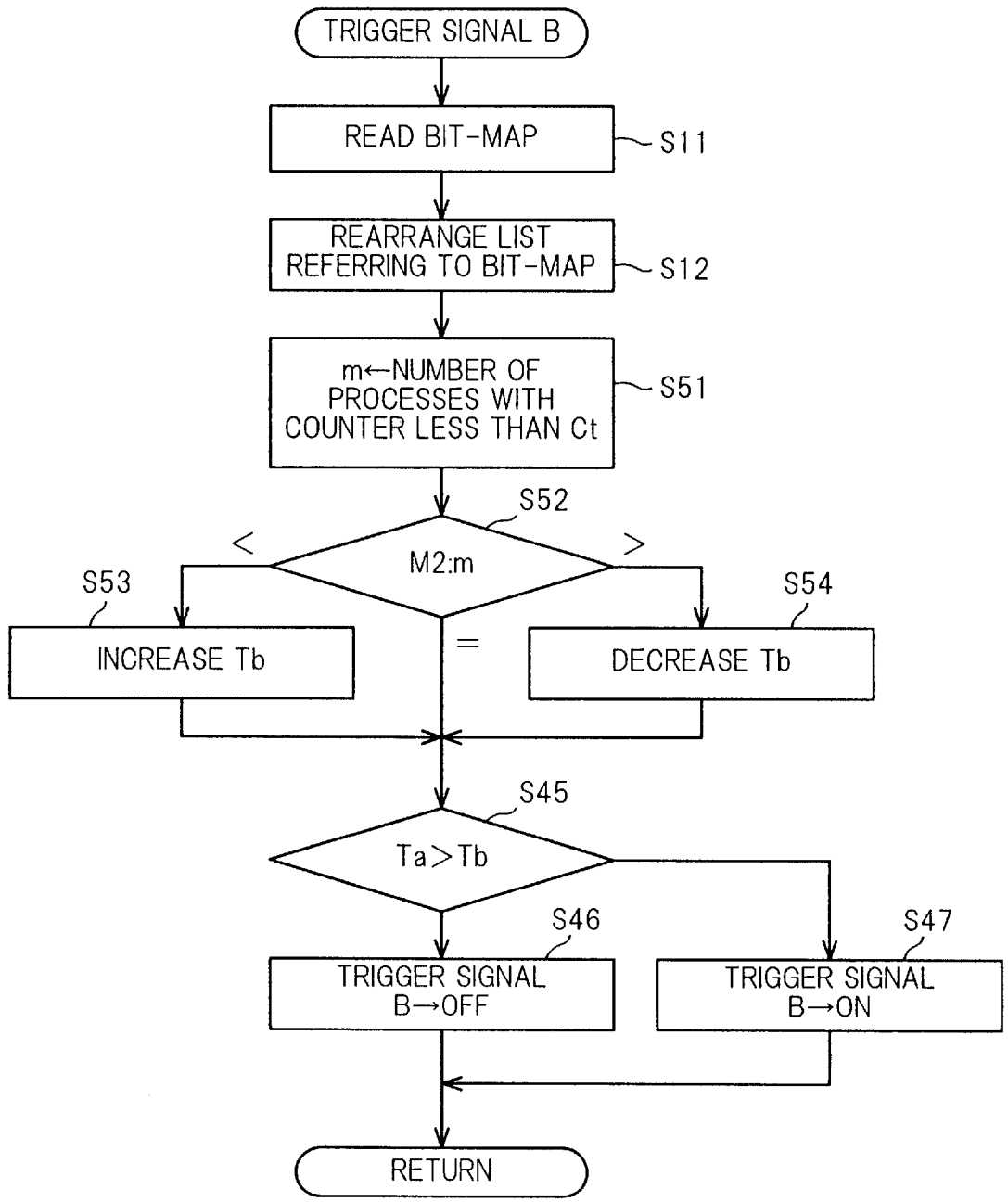
FIG. 12 is a flowchart illustrating the list-management task 23 which is started when the trigger signal B is supplied to the CPU 11 in the fourth embodiment.

FIG. 12 is a flowchart illustrating the list-management task 23 which is started when the trigger signal B is supplied to the CPU 11 in the fourth embodiment.

When the list-management task 23 is started with the trigger signal B, the CPU 11 stores data in the bit-map 21 in the internal register of the CPU 11 (at step S11) by reading the bit-map 21 in the MMU 12, performs rearrangement of elements in the list 24 in the descending order of count values in the bit-map 21 in the same way with the first embodiment or the second embodiment (at step S12). Then, the CPU 11 counts a number m of processes whereof count values are smaller than a predetermined value Ct (at step S51) in the same way with the flowchart of FIG. 11. Then, the CPU 11 compares the number m to the second threshold value M2 (at step S52) instead of the first threshold value M1 of FIG. 11. When the number m is larger than the second threshold value M2, the CPU 11 increases the second initial value Tb of the timer 14 (at step S53), while the CPU 11 decreases the second initial value Tb (at step S54) when the number m is smaller than the second threshold value M2, leaving the second initial value Tb as it is when the number m is equal to the second threshold value M2.

Then, the CPU 11 compares the first initial value Ta to the second initial value Tb (at step S45) in the same way with FIG. 11. When the first initial value Ta is larger than the second initial value Tb, the CPU 11 disables the trigger signal B (at step S46), while the CPU 11 enables the trigger signal B when the first initial value Ta is not larger than the second initial value Tb (at step S47), in the same way with FIG. 11.

Here, the list-management task 23 started by the trigger signal B is returned directly after controlling generation of the trigger signal B without clearing the counter data in the bit-map 21.

As above described, the rearrangement of the elements in the list 24 is performed when either of the trigger signal A or the trigger signal B is generated. Therefore, the list 24 is updated frequently. On the other hand, clearing of the counter data in the bit-map 21 is performed only when the trigger signal A is generated. Therefore, the order of the elements can be determined according to reference frequencies of the processes measured for an appropriate time interval.

Furthermore, when generation intervals of the trigger signal B become shorter than generation intervals of the trigger signal A, the trigger signal B is disabled. Therefore, too frequent rearrangement of the list 24 can be prevented, in the fourth embodiment.

Now, the data retrieval means according to the fifth embodiment of the invention is described.

Figure 13:
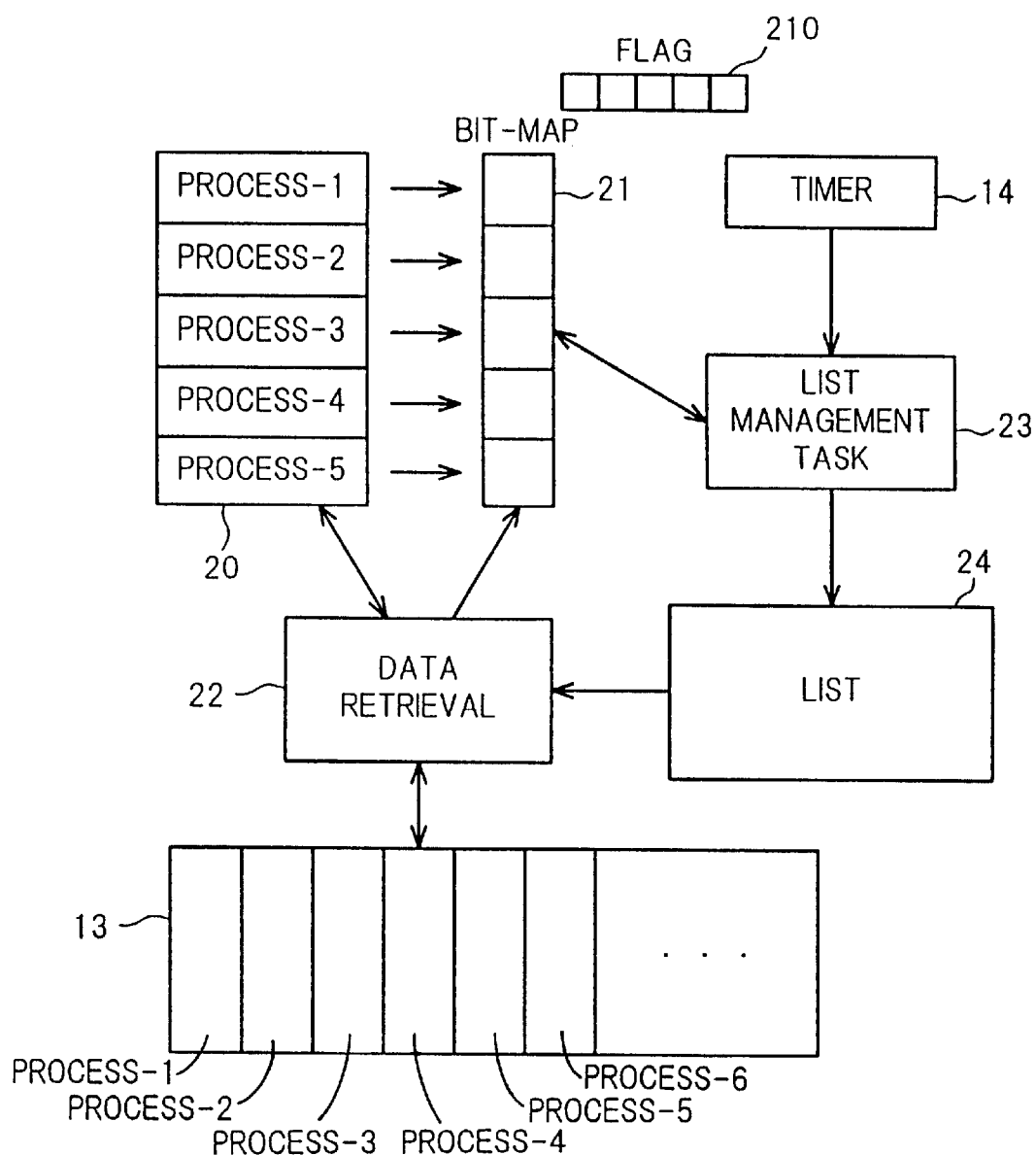
FIG. 13 is a functional block diagram illustrating data retrieval performed according to the fifth embodiment.

FIG. 13 is a functional block diagram illustrating data retrieval performed according to the fifth embodiment, wherein a flag register 210 is comprised in addition to the functional blocks of FIG. 2.

The flag register 210 is provided in the MMU 12 of FIG. 1 and comprises the same number of bits with the number of counters, each corresponding to each of the counters in the bit-map 21, that is, to each of the processes written in the cache table 20.

When one of the processes in the cache table 20 is referred to, the data-retrieval task 22 of FIG. 13 counts up corresponding one of the counters in the bit-map 21, and, at the same time, sets a flag in a respective bit of the flag register 210. The list-management task 23 of FIG. 13 performs reading of the counter data referring to the flag register 210. The list-management task 23 also resets the flag register 210.

Figure 14:
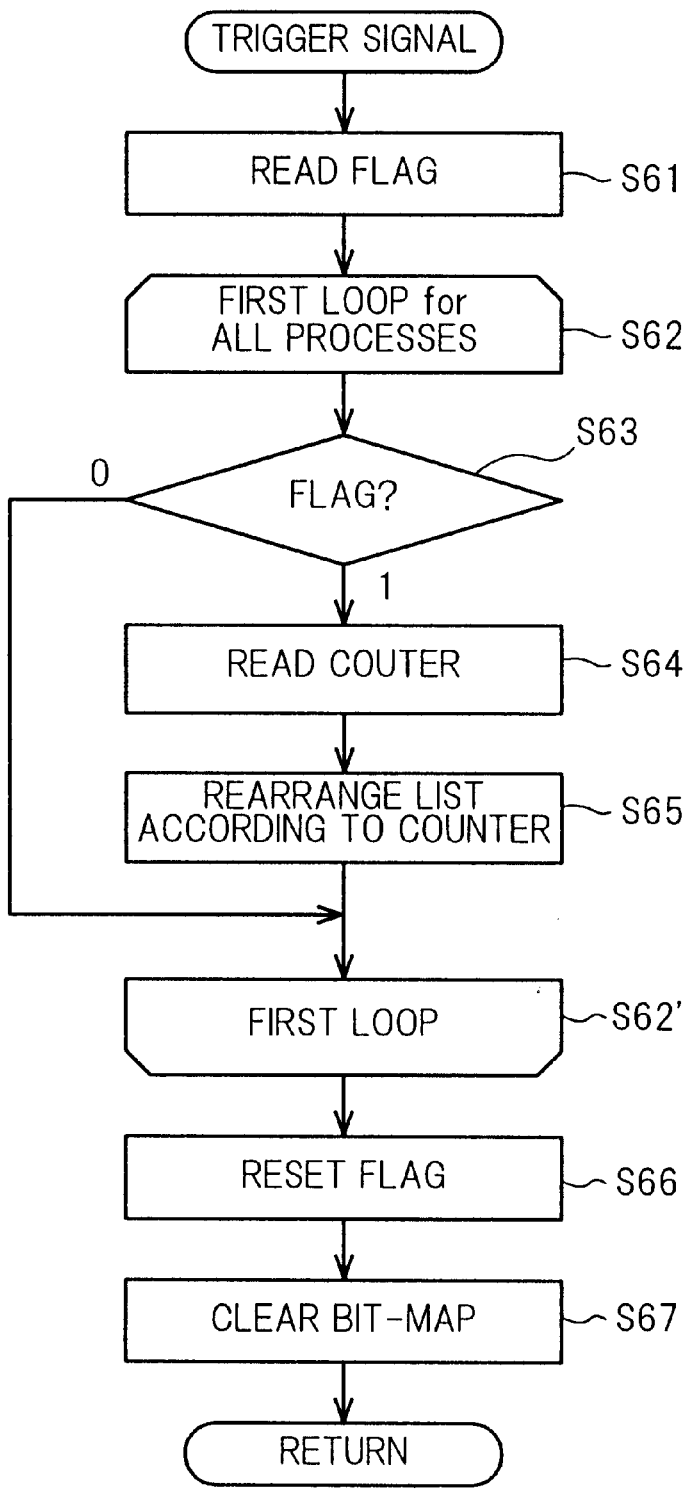
FIG. 14 is a flowchart illustrating the list-management task 23 performed according to the fifth embodiment.

FIG. 14 is a flowchart illustrating the list-management task 23 according to the fifth embodiment, which is started when the trigger signal is supplied to the CPU 11 in the same way with the first embodiment.

When the list-management task 23 is started, the CPU 11 reads the flag register 210 in the MMU 12 and stores data of the flag register 210 in the internal register of the CPU 11 (at step S61).

After storing the data of the flag register 210, the CPU performs a first loop (steps S62 to S62') of the procedure of FIG. 13 for each of the processes. In the first loop, the respective bit of the flag data stored in the internal register is checked (at step S63) for the current process. When the flag is not set in the respective bit, the loop for the current process is finished to repeat the loop for a next process. When the flag is set in the respective bit, the counter value of the respective counter is read out from the bit-map 21 (at step S64), and a element in the list 24 corresponding to the current process is rearranged in the same way as described in connection with FIGS. 5A and 5B, so that the elements makes a queue in descending order of the count values (at step S65).

When all elements whereof corresponding flags are set are rearranged, the procedure of FIG. 14 exits from the first loop, and the list-management task 23 is returned clearing the flag register 210 (at step S66) and the counter data in the bit-map 21 (at step S67).

As above described, reading of the counter data in the bit-map 21 can be limited for counters whereof respective flags are set.

For example, when there are stored 128 processes in the cache table 20, whereof 32 are referred to, and consequently, 128 sets of 16-bit binary counters are provided in the bit-map 21, data of 128×16=2048 bits must be read out and stored in the internal register of the CPU 11, according to the first embodiment, for example, of FIG. 2. On the other hand, only data of 128 bits of the flag register and 32×16 bits of the counter data are sufficient to be read out from the MMU 12. Therefore, operational time to access the MMU 12 and memory space in the internal register of the CPU 11 can be reduced, according to the fifth embodiment.

Furthermore, steps needed for rearranging the elements of the list 24 can be limited for the elements whereof corresponding flags are set. Therefore, the list-management task 23 can be performed in a short time.

Now, the sixth embodiment of the invention is described.

Figure 15:
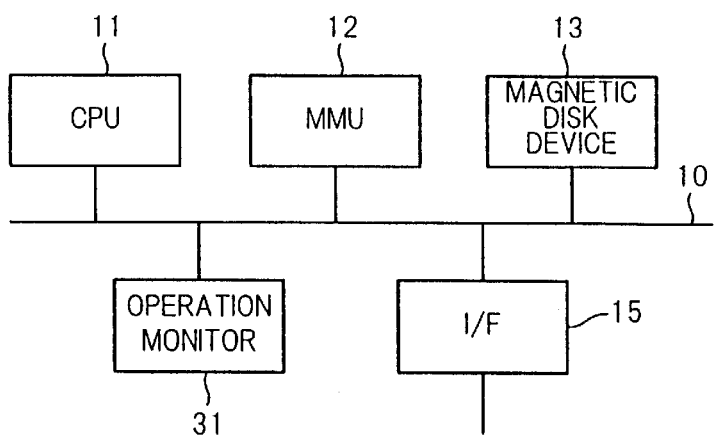
FIG. 15 is a block diagram illustrating an example of hardware configuration for realizing the data retrieving means according to the sixth embodiment.

FIG. 15 is a block diagram illustrating an example of hardware configuration for realizing the data retrieving means according to the sixth embodiment, wherein an operation monitor 31 is provided in place of the timer 14 of FIG. 1.

The operation monitor 31 has a function for monitoring operational load of the CPU 11. When the CPU 11 is in an idle status or its operational load is not heavy, the operational monitor 31 generates a trigger signal to be supplied to the CPU. 11.

Figure 16:
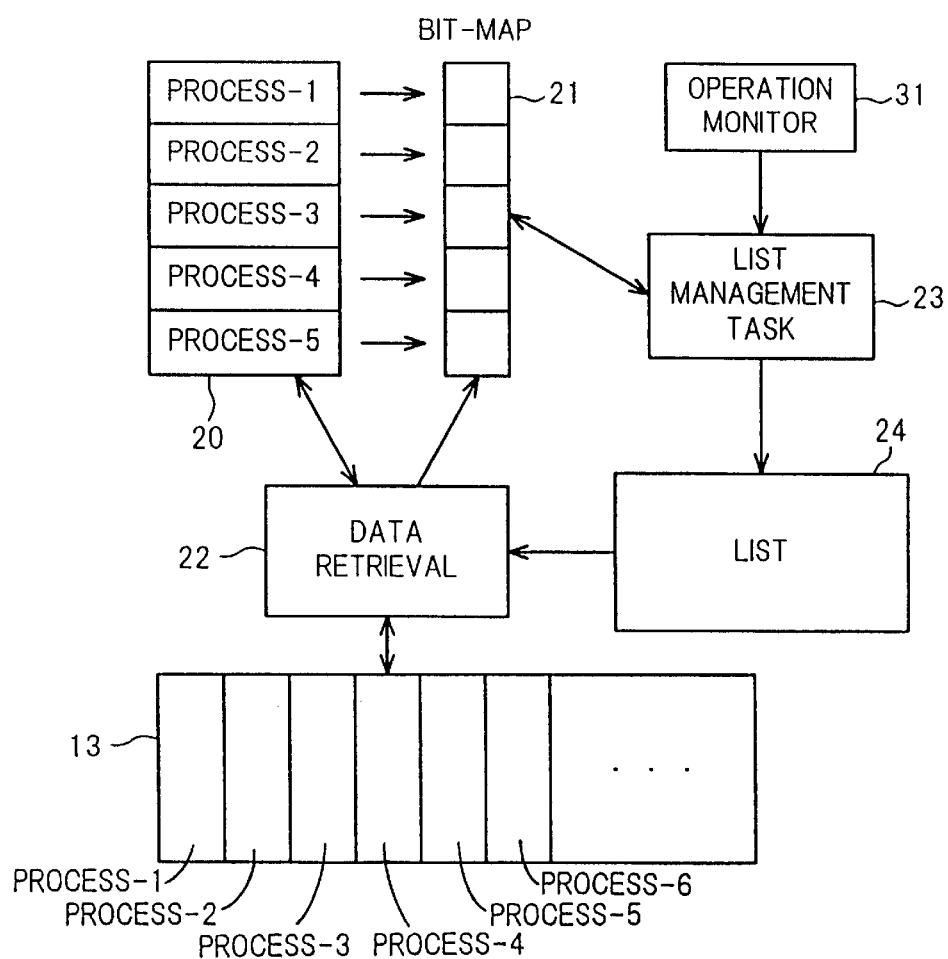
FIG. 16 is a functional block diagram illustrating data retrieval performed in the data retrieving means of FIG. 15.

FIG. 16 is a functional block diagram illustrating data retrieval performed in the data retrieving means of FIG. 15, which is realized by the CPU 11 executing the programs stored in the MMU 12.

In the functional block diagram of FIG. 16, there are depicted a cache table 20, a bit-map 21, a data-retrieval task 22, a list-management task 23, a list 24, and the magnetic disk device 13 wherein the next-destination data are stored, in the same way with FIG. 2. The difference from the functional block diagram of FIG. 2 is that the timer 14 is replaced with the operation monitor 31.

The list-management task 23 is started by the trigger signal generated by the operation monitor 31, in the sixth embodiment. Therefore, the data-retrieval task 22 is not suspended because of overhead taken by the list-management task 23 which is performed when the operational load of the CPU 11 is not heavy.

Now, the seventh embodiment of the invention will be described. In the seventh embodiment, the data retrieving means of a packet exchange is realized with a hardware chip specially provided for the purpose.

Figure 17:
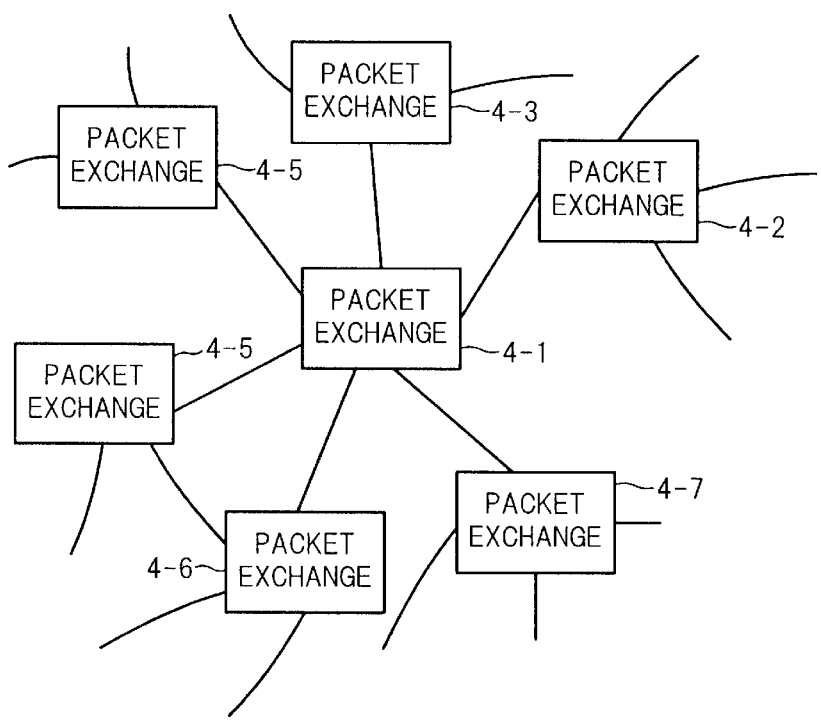
FIG. 17 is a schematic diagram illustrating a packet exchange network.

FIG. 17 is a schematic diagram illustrating a packet exchange network, wherein a packet exchange according to the seventh embodiments is employed.

Referring to FIG. 17, a packet exchange 4-1 is connected to other packet exchanges 4-2 to 4-n. The packet exchange 4-1 receives packets from certain of the other packet exchanges 4-2 to 4-n, and forwards the received packets to certain of the other packet exchanges according to final destinations indicated in the received packets. There may be received packets which are to be forwarded directly to their final destinations such as a personal computer (not depicted in the drawings).

Figure 18:
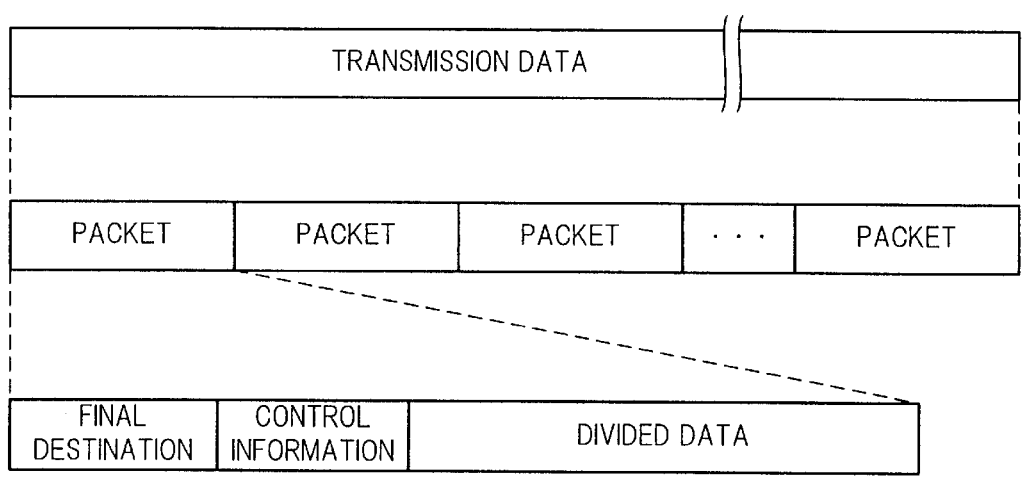
FIG. 18 a schematic diagram illustrating data formats transmitted by way of the packet exchange network of FIG. 17.

FIG. 18 a schematic diagram illustrating data formats transmitted by way of the packet exchange network of FIG. 17. Referring to FIG. 18, transmission data is divided into numbers of packets. Each packet includes information of its final destination and control information to be used for reconstructing the transmission data.

Figure 19:
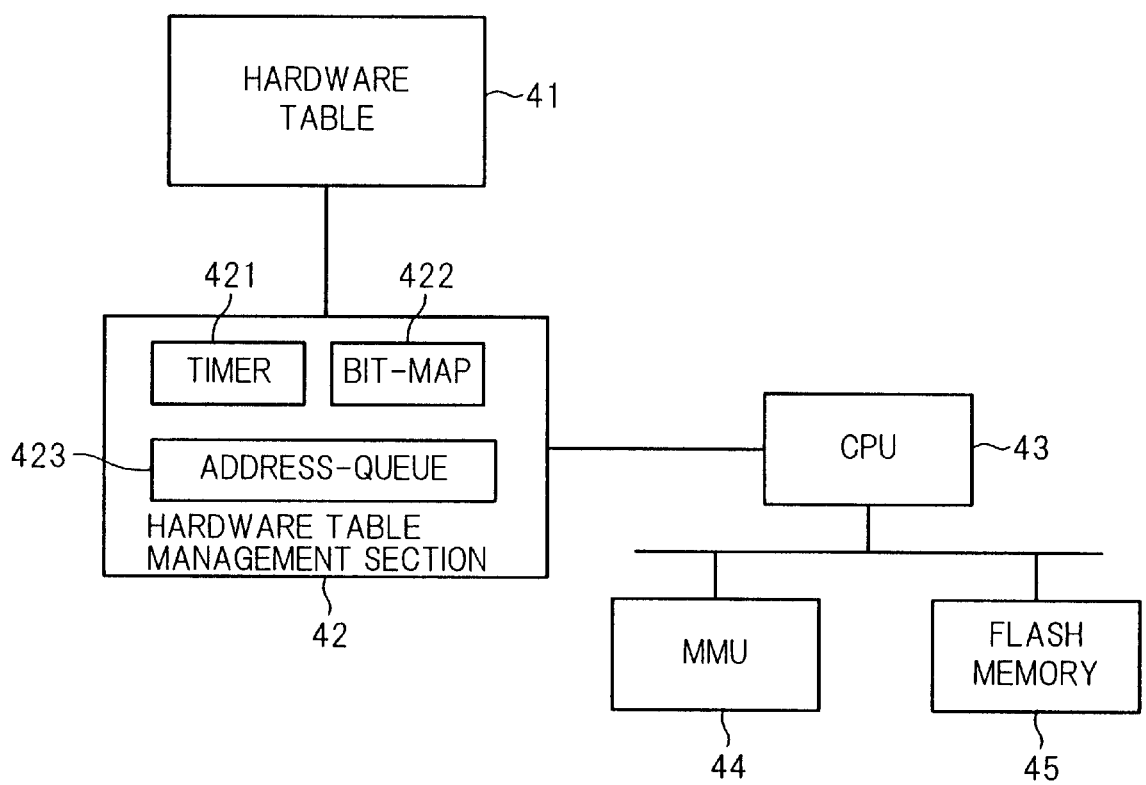
FIG. 19 is a block diagram illustrating a hardware configuration of a data retrieving means provided in a packet exchange according to seventh embodiment of the invention.

FIG. 19 is a block diagram illustrating a hardware configuration of a data retrieving means for retrieving next destinations of the received packets provided in the packet exchange 4-1, for example. The other packet exchanges 4-2 to 4-n may have data retrieving means of the same configuration or of different configuration.

Referring to FIG. 19, the data retrieving means according to the seventh embodiment comprises a hardware table 41, a hardware table management section 42, a CPU 43, an MMU 44 and a flash memory 45.

The hardware table 41 takes charge of retrieving next destinations of the received packets according to the final destinations included therein.

Figure 20:
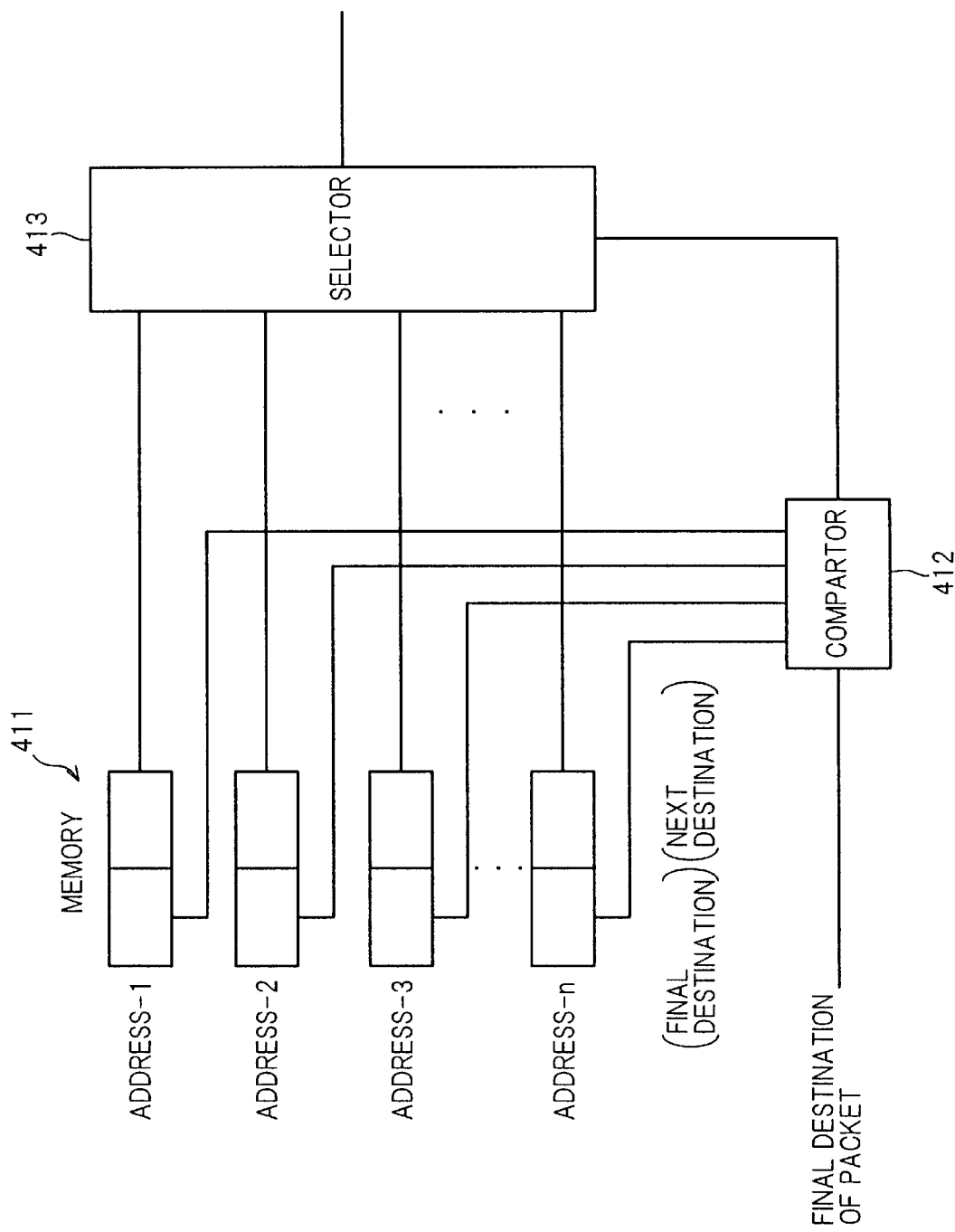
FIG. 20 is a block diagram illustrating a configuration of the hardware table 41 of FIG. 19.

FIG. 20 is a block diagram illustrating a configuration of the hardware table 41 of FIG. 19, comprising a high-speed memory 411, a comparator 412 and a selector 413.

In the high-speed memory 411, consisting of an SRAM (Static Random Access Memory), for example, data of the next destinations are written in connection with data of the final destinations. The data of the next destinations and the final destinations are revised with a task performed by the CPU 43. When a final destination extracted from a received packet is supplied to the comparator 412, the comparator 412 compares the supplied final destination to each of the final destinations written in the high-speed memory 411. When any of the final destinations in the high-speed memory 411 coincides to the supplied final destination, the comparator 412 delivers address data of the coincident final destination to the selector 413. The selector 413 reads and outputs data of a next destination corresponding to the supplied final destination from the high-speed memory 411 making use of the address data delivered from the comparator 412.

The comparator 412 notifies to the CPU 43 whether there is found or not a final destination in the high-speed memory 411 coincident to the supplied final destination.

The hardware table management section 42 comprises a timer 421, a bit-map 422 and an address queue 423. The timer 421 has the same function with the timer 14 of the first embodiment and generates the trigger signal at predetermined intervals. The bit-map 422 comprises a plurality of 1-bit counters each corresponding each of addresses of the high-speed memory 411 where each data set of the final destination and the next destination is written. Each of the 1-bit counters is set to logic '1' when data of a next destination is read out at least once from corresponding one of the addresses in the high-speed memory 411 by the selector 413.

The counter data of the bit-map 422 is read out by the CPU 43 when the trigger signal is supplied to the CPU 43, and in this embodiment, the counter data read out at the timing of a previous trigger signal is stored in a work-area of the MMU 44.

In the address queue 423, addresses of the high-speed memory 411, wherein data sets of the final and the next destination not referred to more than two intervals of the trigger signal are written, are registered according to a first-in-first-out (FIFO) method. The addresses of the address queue 423 are selected referring to current counter data of the bit-map 422 and the previous counter data stored in the work area of the MMU 44.

The CPU 43 performs the data retrieval of the next destination by executing programs stored in the MMU 44. When a packet is received by the packet exchange 4-1, data of the final destination is extracted from the packet and delivered to the hardware table 41. At the same time, data of the final destination is delivered to the CPU 43 and the CPU 43 begins to search the flash memory 45, wherein data of next destinations corresponding to all possible final destinations are stored. When the CPU 43 is notified from the comparator 412 that the next destination is found in the high-speed memory 411, the CPU 43 stops to search the flash memory 45, and otherwise, the CPU 43 retrieves and outputs the next destination from the flash memory 45, and at the same time, stores retrieved data set of the final destination and the next destination in the work area of the MMU 44.

The CPU 43 also performs revision of the hardware table 41, every time when the trigger signal is generated by the timer 421, with the retrieved data sets stored in the work area, referring to current counter data of the bit-map 422, and the previous counter data stored in the work area of the MMU 44.

The MMU 44 is composed of a DRAM (Dynamic Random Access Memory) and has a memory space for storing the programs to be executed by the CPU 43 and a memory space to be used as the work area of the CPU 43.

The flash memory 45 is a nonvolatile memory which can be erased block by block, and the data of next destinations, such as the packet exchanges 4-2 to 4-n, corresponding to all possible final destinations are stored, as above described.

Now, operation of the data retrieving means according to the seventh embodiment is described.

When the packet exchange 4-1 receives a packet from one of the other packet exchanges 4-2 to 4-n, for example, data of its final destination is extracted and delivered to the comparator 412 of the hardware table 41 and the CPU 43 in parallel.

In the hardware table 41, the comparator 412 compares the supplied final destination to each of the final destinations written in the high-speed memory 411.

When any of the final destinations in the high-speed memory 411 coincides to the supplied final destination, the comparator 412 delivers address data of the coincident final destination to the selector 413. The selector 413 reads and outputs data of a next destination corresponding to the supplied final destination from the high-speed memory 411 making use of the address data delivered from the comparator 412, and sets a counter in the bit-map 422 corresponding to the address data to logic '1'. The received packet is forwarded to one of the other packet exchanges 4-2 to 4-n indicated by the retrieved data of the next destination. The comparator 412 notifies a success of the retrieval to the CPU 43 that there is found a final destination coincident to the supplied final destination.

The CPU 43 also begins to search the flash memory 45 for retrieving a next destination corresponding to the delivered final destination of the received packet, when the final destination of the received packet is delivered. When the CPU 43 is notified from the comparator 412 that the next destination is found in the high-speed memory 411, the CPU 43 stops to search the flash memory 45, and otherwise, the CPU 43 retrieves and outputs the next destination from the flash memory 45. The received packet is sent to one of the other packet exchanges 4-2 to 4-n according to the retrieved data, and at the same time, the retrieved data set of the final destination and the next destination is stored in the work area of the MMU 44.

During numbers of packets are thus received and forwarded, the timer 421 counts down its count value according to a clock signal, and outputs a trigger signal to the CPU 43 when the count value becomes 0.

When the trigger signal is supplied from the timer 421, the CPU 43 starts a hardware table maintenance task. The CPU reads the bit-map 422 in the hardware table management section 42, and writes each of the retrieved data sets stored in the work area of the MMU 44 in the high-speed memory 411 at addresses registered in the address queue 423 from top of the FIFO address queue. When writing each of the retrieved data sets, 1-bit counters in the bit-map 422 is referred to and the address whereof corresponding 1-bit counter is set is not used for writing the retrieved data sets, so that data of next destination which is referred to after the last trigger signal may not be expelled from the hardware table 41.

Then, the CPU 43 checks the address queue 423, the previous counter data stored in the work area of the MMU 44 and the current counter data of the bit-map 422. If there is found an address which is not registered in the address queue and whereof 1-bit counter is set neither in the previous counter data stored in the work area nor in the current counter data of the bit-map 422, the address is newly registered in the address queue 423. If there is found an address which is registered in the address queue and whereof 1-bit counter in the current counter data of the bit-map 422 is set, the address is deleted from the address queue 423. Then, the CPU revises the previous counter data stored in the work area of the MMU 44 with current counter data of the bit-map 422.

Thus, addresses storing data sets of the final destination and the next destination which are not referred to more than two intervals of the trigger signal are ranged in the FIFO address queue 423 substantially in order of length of their time intervals where their respective data sets are not referred to.

As above described, data sets of the final destination and the next destination which are frequently referred to are written in the high-speed memory 411, in the seventh embodiment. Therefore, retrieval of next destinations of the received packet can be performed with high speed and performance of the packet exchange is improved.

Furthermore, the data update of the hardware table 41 is performed at an appropriate interval. Therefore, the retrieval of the next destination is little affected by the overhead taken by the data update of the hardware table 41.

Still further, only frequently referred data sets are written in the hardware table 41 by performing update of the hardware 41 at appropriate timings. Therefore, performance of the packet exchange can be improved with a low cost.

Heretofore, the invention is described in connection with the first to the seventh embodiment. However, the scope of the invention is not limited in these embodiments.

In the seventh embodiment, the data sets written in the high-speed memory 411 are described to be revised referring to the address queue 423 which is registered according to the previous counter data stored in the work area of the MMU 44 and the current counter data of the bit-map 422. However, the data sets in the high-speed memory 411 may be revised directly referring to the counters in the bit-map 422, in a similar way to the first to sixth embodiment, by providing 4-bit binary counters in the bit-map 422, for example, or, the address queue 423 may be registered referring to more sets of counter data obtained at more than two timings of the trigger signal.

The trigger signal may be generated when load of the CPU 43 is not heavy also in the seventh embodiment as described in the sixth embodiment. Furthermore, an old data set stored in the high-speed memory 411 may be revised every time when a data set is retrieved from the flash memory 45, as described in connection with the first embodiment.

Still further, the embodiments are described to be employed for list management used for retrieving the next destination of the packet exchange. However, the list management system and the list management method according to the invention are widely applicable for many systems, such as a system for managing reference frequencies of page data in a virtual memory or a system for managing reference frequencies of block data in a cache memory, for example.

What is claimed is:

1. A list management system comprising:
a trigger generating means for generating a trigger signal every time when a time interval is passed;
counters each corresponding to each of a plurality of processes and counting a reference frequency of each of the processes;
a list of elements each corresponding to each of the processes and connected with each other by way of pointer data; and
a list maintenance means for rearranging order of the elements according to count values of the counters, when the trigger signal is generated.

2. A list management system as recited in claim 1, wherein each of the elements is rearranged by the list management means in descending order of the reference frequency counted by corresponding one of the counters.

3. A list management system as recited in claim 2; wherein the elements which correspond to the counters showing the same count values are ranged according to previous order of the elements.

4. A list management system as recited in claim 2; wherein the elements which correspond to the counters showing the same count values are ranged in the same order.

5. A list management system as recited in claim 1, wherein the list maintenance means has a function to clear the count values of the counters after rearranging every of the elements.

6. A list management system as recited in claim 5; wherein:
the trigger generating means generates a first trigger signal every time when a first time interval is passed and a second trigger signal every time when a second time interval is passed; and
the list maintenance means rearranges the elements and clears the count values when the first trigger signal is generated, and rearranges the elements without clearing the count values when the second trigger is generated.

7. A list management system as recited in claim 6; wherein the list maintenance means further has a function to control at least one of the first time interval and the second time interval according to the reference frequency counted by each of the counters.

8. A list management system as recited in claim 7; wherein the list maintenance means further has:
a function to perform comparison of the first time interval with the second time interval; and
a function to control whether generation of the second trigger signal is enabled or disabled according to a result of the comparison.

9. A list management system as recited in claim 1, wherein the time interval is controlled according to the reference frequency counted by each of the counters.

10. A list management system as recited in claim 1; wherein:
flags are further comprised, each of the flags corresponding to each of the processes and being set when corresponding one of the processes is referred to at least once; and
the list maintenance means rearranges the elements according to count values counted by certain of the counters, the certain of the counters corresponding to the flags being set.

11. A list management system comprising:
a trigger generating means for generating a trigger signal every time when a time interval is passed;
counters each corresponding to each of a plurality of processes;
a list of elements each corresponding to each of the processes and connected with each other by way of pointer data; and
a CPU (Central Processing Unit) provided for referring to the processes, the CPU further incrementing a count value of one of the counters every time when the CPU refers to one of the processes corresponding to said one of the counters, and rearranging order of the elements according to count values of the counters, when the trigger signal is generated.

12. A list management system as recited in claim 11: wherein the CPU clears the count values of the counters after rearranging the elements.

13. A list management system comprising:
counters each corresponding to each of a plurality of processes;
a list of elements each corresponding to each of the processes and connected with each other by way of pointer data;
a CPU provided for referring to the processes, the CPU further incrementing a count value of each of the counters every time when the CPU refers to one of the processes corresponding to said each of the counters, and rearranging order of the elements according to count values of the counters, when a trigger signal is generated; and
an operation monitor for generating the trigger signal when an operational load of the CPU is discriminated to be light.

14. A list management system as recited in claim 13: wherein the operational load of the CPU is discriminated to be light when any of the processes is not referred to for a fixed time.

15. A list management system as recited in claim 12: wherein the CPU clears the count values of the counters after rearranging the elements.

16. A method of managing a list of elements each corresponding to each of a plurality of processes and connected with each other by way of pointer data; said method comprising:
a step of generating a trigger signal every time when a time interval is passed;
a step of counting a reference frequency of each of the processes, the step of counting being performed during the time interval; and
a step of rearranging order of the elements according to the reference frequency counted for each of the processes, the step of rearranging being performed when the trigger signal is generated.

17. A method of managing a list of elements each corresponding to each of a plurality of processes and connected with each other by way of pointer data; said method comprising:
a step of counting a reference frequency of each of the processes;
a step of monitoring length of a period wherein any of the processes is not referred to; and
a step of rearranging order of the elements according to the reference frequency counted for each of the processes, the step of rearranging being performed when the length of the period longer than a fixed time is monitored.

18. A recording medium wherein is recorded a program to be implemented by a computer for managing a list of elements each corresponding to each of a plurality of processes and connected with each other by way of pointer data; the program comprising:
- a step of generating a trigger signal every time when a time interval is passed;
- a step of counting a reference frequency of each of the processes, the step of counting being performed during the time interval; and
- a step of rearranging order of the elements according to the reference frequency counted for each of the processes, the step of rearranging being performed when the trigger signal is generated.

19. A recording medium wherein is recorded a program to be implemented by a computer for managing a list of elements each corresponding to each of a plurality of processes and connected with each other by way of pointer data; the program comprising:
- a step of counting a reference frequency of each of the processes;
- a step of monitoring length of a period wherein any of the processes is not referred to; and
- a step of rearranging order of the elements according to the reference frequency counted for each of the processes, the step of rearranging being performed when the length of the period longer than a fixed time is monitored.

20. A packet exchange composing a node of a packet transmission network for forwarding each of received packets to a next destination determined according to a final destination described in said each of the received packets; the packet exchange comprising:
- a trigger generating means for generating a trigger signal;
- a first memory for storing a plurality of first data sets each including information of a next destination corresponding to each of final destinations which are possible to be described in the received packets;
- a second memory for storing each of second data sets in each of addresses of the second memory, the second data sets being a part of the first data sets and the second memory being accessed with higher speed than the first memory;
- counters each corresponding to each of the addresses of the second memory;
- a first retrieving means for retrieving data of a next destination corresponding to a final destination described in a received packet from the second data sets stored in the second memory;
- a memory management means for incrementing a count value of one of the counters when the first retrieving means successes to retrieve the data of the next destination from an address of the second memory corresponding to said one of the counters;
- a second retrieving means for retrieving data of the next destination corresponding to the final destination described in the received packet from the first data sets stored in the first memory when the first retrieving means can not retrieve the data of the next destination from any address of the second memory; and
- a memory maintenance means for revising a necessary number of the second data sets stored in the second memory into data sets each including each of next destinations retrieved by the second retrieving means from the first memory, the necessary number of the second data sets being selected according to count values of the counters at a timing when the trigger signal is generated.

21. A packet exchange as recited in claim 20; wherein the memory maintenance means comprises:
- a means for selecting candidates to be revised from the second data sets stored in the second memory according to the count values of the counters at a timing when the trigger signal is generated; and
- a means for revising the necessary number of the candidates into the data sets each including each of the next destinations retrieved by the second retrieving means from the first memory.

22. A packet exchange as recited in claim 20; wherein the memory maintenance means revises one of the second data sets stored in the second memory into a data set including a next destination retrieved by the second retrieving means from the first memory, every time when the next destination is retrieved from the first memory.

23. A packet exchange as recited in claim 20; wherein the memory maintenance means revises the necessary number of the second data sets stored in the second memory into the data sets each including each of the next destinations retrieved by the second retrieving means from the first memory, when the trigger signal is generated.

24. A packet exchange as recited in claim 23; further comprising:
- a third memory for temporarily storing the data sets each including each of the next destinations retrieved by the second retrieving means from the first memory, the necessary number of the second data sets stored in the second memory being revised into the data sets stored in the third memory.

25. A packet exchange as recited in claim 23; wherein the count values of the counters are cleared when the necessary number of the second data sets stored in the second memory are revised.

26. A packet exchange as recited in claim 20; wherein:
- each of the counters is a one-bit counter comprising a flag of one bit which is set when a data set stored at an address of the second memory corresponding to said one of the counters is referred to;
- a counter data storing means is further comprised for storing at leas one counter data set, the counter data set being data of the counters at a timing when the trigger signal is generated; and
- the memory maintenance means revises the necessary number of the second data sets stored in the second memory, according to actual count values of the counters at a timing when the trigger signal is generated and said at least one counter data set each stored in the counter data storing means at each of timings when the trigger signal is generated previously.

27. A packet exchange as recited in claim 20; wherein the trigger generating means generates the trigger signal every time when a time interval is passed.

28. A packet exchange as recited in claim 20; wherein the second retrieving means and the memory maintenance means are realized by a CPU.

29. A packet exchange as recited in claim 28; wherein the trigger generating means generates the trigger signal when an operational load of the CPU is discriminated to be light.

30. A packet exchange as recited in claim 20; the first retrieving means comprising:
- a comparator for comparing the final destination described in the received packet to each of final destinations of the second data sets stored in the second memory, and outputting an address of the second memory where a data set having the same final destination with the final destination described in the received packet is stored, when the data set having the same final destination is found; and a selector for outputting a next destination corresponding to the final destination described in the received packet by accessing the second memory making use of the address output from the comparator.

* * * * *